Aug. 4, 1970 G. CAGEN 3,523,270

INTEGRAL SOCKET FOR PHOTOFLASH LAMP

Filed Oct. 1, 1968

INVENTOR.
GEORGE CAGEN
BY Amster Rothstein
ATTORNEYS

United States Patent Office 3,523,270
Patented Aug. 4, 1970

3,523,270
INTEGRAL SOCKET FOR PHOTOFLASH LAMP
George Cagen, Brooklyn, N.Y., assignor to Ideal Toy Corporation, Hollis, N.Y., a corporation of New York
Filed Oct. 1, 1968, Ser. No. 764,349
Int. Cl. H01r 13/54
U.S. Cl. 339—91           5 Claims

ABSTRACT OF THE DISCLOSURE

A receiving socket and electrical connector for multiple lamp photoflash cubes is formed of a single piece of plastic molded to include a plurality of upward extending retaining arms which are positioned to receive a flash cube base. The arrangement of retaining arms is designed to permit an inserted flash cube to rotate at 90 degree intervals between proper firing positions while preventing the cube from attaining any intermediate positions.

---

This invention relates to a receiving socket and electrical connector for use in conjunction with multiple lamp photoflash packages, frequently referred to as flash cubes, of a type which have come into widespread use in the photographic arts.

Such packages typically comprise four miniature flash lamps orthogonally positioned within a disposable cubic plastic casing. Each lamp is provided with an individual dish reflector and the entire assembly is mounted on a specially dimensioned base member which includes a cylindrical center post and four orthogonally located positioning lugs.

Flash packages of this type are intended to be attached to a still camera with a first one of the four flash lamp and reflector combinations aligned to illuminate a subject to be photographed. In this position only the forward facing flash lamp is connected through a switch or timing device associated with the camera shutter to an appropriate source of electrical power, usually a dry cell battery. When the shutter is operated, the bulb is ignited, illuminating the subject as the film is exposed. The film is then advanced and the cube is rotated by 90 degrees thus aligning a second bulb and reflector combination with the field to be photographed and making appropriate electrical contact between the second bulb and the power source. When the shutter is operated again, the second bulb is ignited after which the cube is again rotated. When all four bulbs are used, the cube is removed from the camera and discarded and a new cube is substituted in its place.

The above arrangement has been found to provide a safe, convenient and highly marketable method of flash photography. However, in order to employ multiple lamp photoflash packages of the type described, a camera must be equipped with a receiving socket which will securely maintain the multiple lamp flash package in proper alignmetn while making appropriate electrical contact with the lead wires of only the forward facing flash bulb. Such a socket must permit rotation of the flash package between proper alignment positions and must allow easy insertion and removal of such packages.

Prior socket arrangements for securing multiple lamp flash packages of the type described above include complex arrangements of springs and structural members which are expensive to manufacture and difficult to install. Several such socket arrangements are described in Pats. 3,353,465 to Peterson et al. and 3,353,468 to Beach issued Nov. 21, 1967.

It is thus an object of the present invention to provide a receiving socket for multiple lamp photoflash packages which is simple and inexpensive to manufacture and which can be easily secured to a camera or other appropriate device.

In accomplishing this object and in accordance with the invention, a multiple lamp photoflash package is secured to a camera or other device by a receiving socket formed of a single piece of molded plastic or similar material. The base of the flash package is retained in the socket by a plurality of resilient arms symmetrically disposed about a central axis. In a preferred embodiment of the invention, the socket includes four upward extending arms orthogonally disposed about the central axis so as to create a cavity of approximately square cross-section. The arms are preferably positioned apart sufficiently to accept the flash package only with each positioning lug on the flash package base located between two adjacent arms. Additionally, each arm is dimensioned to include an undercut on its inner face positioned to engage and secure the flash package base member, and a curved bevel at its uppermost extremity to facilitate rotation of the flash package during insertion of the cube. The socket may further include a plurality of upward extending support posts arranged to stabilize a flash package in approximately horizontal position and a pair of selectively positioned electrically conductive contact elements. With this configuration, the socket readily accepts a multiple lamp photoflash cube in proper position but resists insertion of the cube in improper alignment. Once inserted, the cube is securely retained and may be easily rotated between proper firing alignments.

The invention will be more fully understood from the following detailed description of a preferred embodiment thereof taken in conjunction with the appended drawings wherein.

Figure 8:
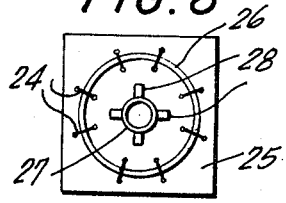
FIG. 8 is a bottom view of a conventional multiple lamp photoflash cube.
Figure 3:
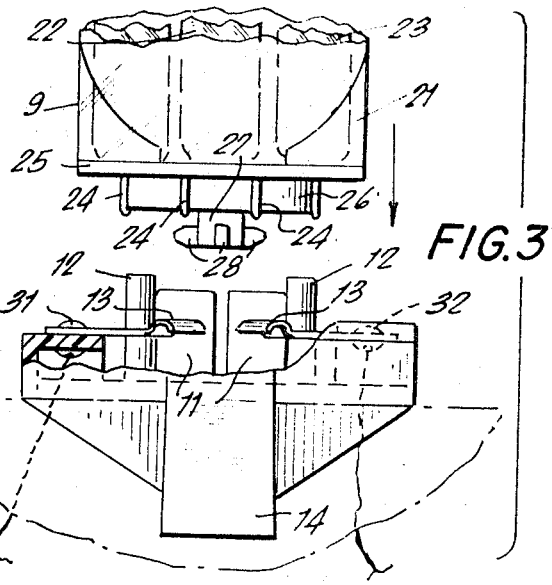
FIG. 3 is a partially sectioned front view of the receiving socket together with a flash cube.
Figure 4:
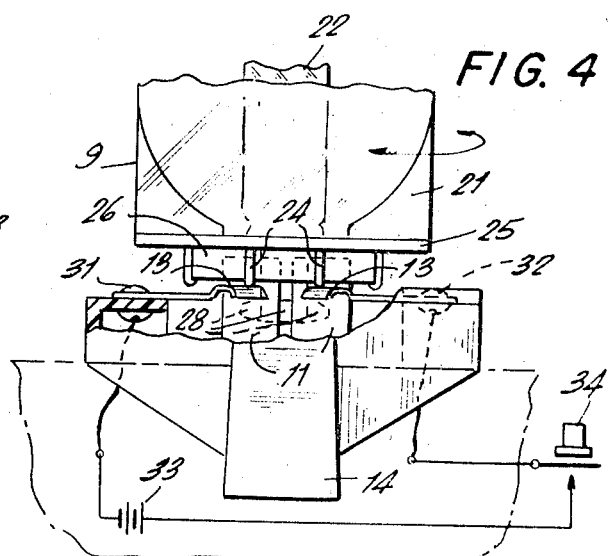
FIG. 4 is a partially sectioned front view of a receiving socket with a flash cube fully attached.

Referring to the figures, receiving socket 10 is designed in accordance with a preferred embodiment of the invention to accommodate multiple lamp photoflash packages (flash cubes) of the type shown in front view in FIGS. 3 and 4 and in bottom view in FIG. 8. Such a multiple lamp package 9 typically comprises a cubic casing of transparent material 21 containing 4 flash lamps 22 orthogonally disposed about a central vertical axis of rotation. Each lamp is customarily supplied with an individual dish reflector 23 and includes a pair of lead wires 24 which extend downward through a base member 25 to a position on a non-conductive electrical contact ring 26 where they are exposed for appropriate electrical interconnection with a flash camera. The base of a flash package generally includes a cylindrical center post 27 and four orthogonally located positioning lugs 28, each including upper and lower ramped down surfaces. The lugs are each aligned with one of the four flash lamps so that when the lug is directed forward toward the subject being photographed a flash lamp and its associated reflector are similarly aligned toward the subject.

Figure 1:
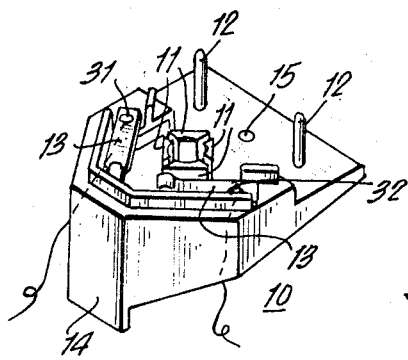
FIG. 1 is a perspective view of a flash cube receiving socket constructed of a single molded piece of plastic in accordance with the invention.

Socket 10, shown in perspective view in FIG. 1 comprises a single molded piece of plastic formed to include a chassis 14 and four resilient upward extending arms 11 arranged to engage the base assembly of a multiple lamp flash package and align it with one of the positioning lugs 28 always facing forward. The socket is additionally provided with a pair of upward extending support posts 12 which abut the flash package and tend to maintain it in a horizontal position so that the desired photographic field is properly illuminated and so that the flash lamp lead wires make proper electrical contact with a pair of electrically conductive contact elements 13 which are secured to the socket chassis. The socket chassis itself is shaped to be easily mounted upon a camera or other device by means of a screw or rivet through an appropriately positioned aperture 15.

Figure 2:
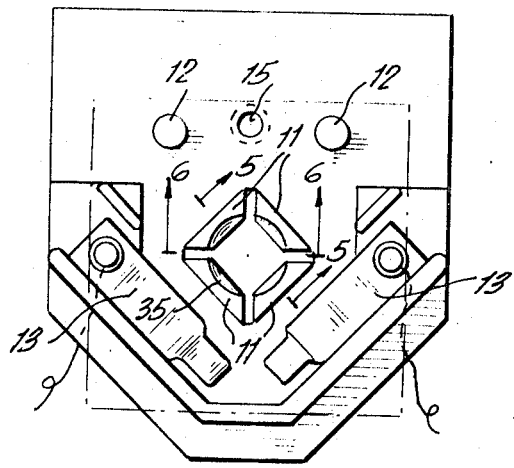
FIG. 2 is a top view of the receiving socket.

A significant aspect of the invention resides in the four upward extending resilient arms 11 which are dimensioned and positioned to secure the center post 27 of a flash package in any one of four stable alignments located 90 degrees apart from one another while preventing the package from maintaining any intermediate position. In a preferred embodiment of the invention, each arm 11 comprises a relatively flat planar element of trapezoidal cross-section as seen in FIG. 2. The arms are orthogonally disposed about a central axis and are spaced apart slightly so as to form a cavity of approximately square cross-section with one corner of the square facing forward. The distance between each pair of opposing arms 11 is selected to be greater than the diameter of center post 27 but smaller than the distance between the tips of two opposite positioning lugs 28. The separation between each pair of adjacent arms 11 is selected to be smaller than the width of positioning lug 28. In addition, the interior face of each arm 11 includes undercut 17, shown in FIG. 5, at a selected point below the arms' upper extremity. The location of the undercut 17 is selected so that the distance between the undercut and the upper extremity of arm 11 is slightly less than the distance from the bottom of base member 25 on flash package 9 to the upper ramped down surface of locking lugs 28.

Figure 6:
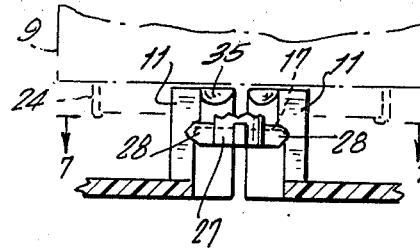
FIG. 6 is a cross-sectional view of the mating elements of a flash cube and the receiving socket taken along the line 6—6 in FIG. 2.
Figure 7:
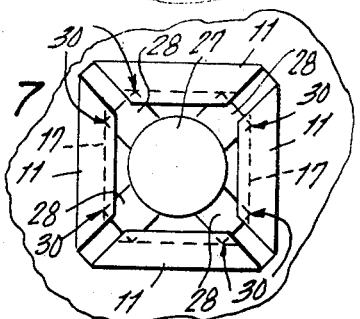
FIG. 7 is a cross-sectional view of a flash cube base and the receiving socket taken along line 7—7 in FIG. 6.

The above described configuration permits easy insertion of a flash cube only when it is properly aligned. Thus, the arms 11 are each made sufficiently resilient so that when the base of a flash cube is brought into contact with the retaining arms, each arm will engage a positioning lug 28 and will resist the insertion of the center post 27 unless each lug 28 is aligned with the separation between two adjacent arms. This position corresponds to the cube's proper firing position. When the flash package is properly aligned with lugs 28 abutting two adjacent arms, the package can be urged gently downward thereby spreading the arms 11 apart slightly, away from their normal vertical alignment. When the flash package is urged downward sufficiently, the positioning lugs 28 pass beneath the undercut 17 and the arms 11 snap back into vertical alignment thus locking the flash package into position. This locked condition is shown in cross-sectional view in FIG. 2. Note that the lugs 28 are slightly forward of the retaining arms 11, with the undercut 17 just above the center of the lugs and with the upper ramped down surface of each lug 28 engaging the undercut 17 of each of two adjacent arms 11 at first contact points 30. The engagement is more clearly shown in FIG. 7 which is a sectional view taken along line 7—7 in FIG. 6, just below the curved bevel and above the undercut 17.

The engagement of the undercut 17 of each pair of arms 11 with the upper ramped down surface of each lug 28 at points 30 is sufficient to prevent the flash package from being jarred loose from the socket in normal operation. However, the resilient nature of the arms 11 permits the cube to be withdrawn from the socket when sufficient upward force is exerted. Further, in this position, the flash package is maintained in horizontal alignment by the nearly flush contact which is made between the uppermost end of each of the four arms 11 and the base plate 26 of the flash package, aided by the contact between the base plate 26 and two positioning posts 12 located behind the locking arms 11.

Once the flash package has been secured in a first one of its proper firing positions, it can be easily rotated between the other proper firing positions located 90 degrees apart from one another but is prevented from assuming an intermediate position. Thus, in FIG. 7 the cube is secured in a first of its proper firing positions with each lug 28 engaging two adjacent arms 11 at points 30. Note that the distance from the central axis about which the arms 11 are disposed to the undercut 17 on each arm at a first point 30 is greater than the distance between the central axis and any second contact point on each arm intermediate said first points 30.

Thus, with the lugs 28 abutting two adjacent arms, the cube base and lugs fit easily within the undercut of the socket. When the cube is rotated slightly, each lug 28 engages one of the arms 11 at a second contact point and forces that arm slightly outward. Because of the arm's resilient nature, it tends to exert an opposite force on the lug, which force increases as the cube is rotated toward a position 45 degrees away from its proper position. Until 45 degrees rotation is achieved, this opposite force urges the cube back to its initial position. Once the cube is rotated past 45 degrees, the force exerted by the arms tends to advance the cube to its next stable position corresponding to a second proper firing alignment.

Thus, in any position other than one of its proper firing positions, the cube is in an unstable condition. Additionally, it should be noted that because of the resilient nature of the arms 11, the flash cube is most securely retained within the arms during the course of rotation, when it is positioned away from its proper firing alignment. It is at this time that the downward force exerted by arms 11 on the upper ramped down surface of lugs 28 is greatest. This is precisely the time when the cube is most likely to be subject to unintended forces which would tend to dislodge it.

Figure 5:
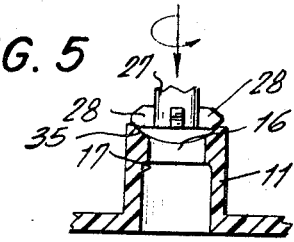
FIG. 5 is a cross-sectional view of the mating elements of the receiving socket and the base of a flash cube taken along line 5—5 in FIG. 2.

In order to facilitate rotation of the flash cube base during insertion into the socket and to permit insertion of a cube without visual alignment, each arm 11 includes a curved indentation 16 at its uppermost extremity as shown in FIG. 5. The combination of four such indentations arranged as they are on the four orthogonally positioned arms 11 create a circular cavity 35, shown in FIG. 2, inscribed in the upper portion of the square cavity formed between the four arms 11.

Upon inserting the package base into the socket, the four positioning lugs 28 on the package base are first brought into contact with the circular cavity 35. Slight downward pressure is then applied and the flash cube is rotated slightly until it is in proper alignment at which time the arms 11 give way slightly. As the package is urged further downward, it becomes engaged beneath the undercut 17 and secured as described above. Thus, it is not necessary to align the cube usually before insertion.

FIGS. 3 and 4 show the socket 10 and a flash cube 9 in partially sectioned view exposing the electrical contact arrangement. As indicated above, the typical multiple lamp photoflash package includes a circular electrical contact ring 26 of insulating material as an integral part of its base member. The electrical terminals 24 from each flash lamp are disposed about this ring so that when a first flash lamp is facing forward in proper firing position, its two electrical contacts are in the forward-most locations on the ring. In order to fire the lamp, the socket is equipped with a pair of cantilever spring contact elements 13 which are secured to the socket chassis 14 at connectors 31 and 32. The contact elements are positioned so that when the flash package is secured to the socket, one contact 13 abuts each of the lead wires 24 of the forward-most flash lamp 22 as shown in FIG. 4. The arms 13 are connected through connectors 31 and 32 and through a switch 34 to a battery or other appropriate power source 33. As described previously, when the camera shutter is activated, switch 34 closes for an instant making electrical contact between the opposite poles of battery 33 across the lead wires of bulb 22 thus igniting the bulb. The flash package may then be rotated to the next of its four stable positions so that the next bulb may be fired. When all four bulbs are ignited, the flash cube is discarded and replaced by a new cube.

It is to be understood that the above described arrangements are merely illustrative of the application of the principles of the invention. Other arrangements may be devised by those skilled in the art without departing from the spirit and scope of the invention.

What is claimed is:

1. A receiving socket for multiple lamp photoflash cubes of the type which have a base section including an electrical contact ring and a center post carrying a plurality of radially extending positioning lugs, and which can assume a plurality of proper firing alignments, said receiving socket comprising a single piece of material molded to include a chassis and four upward extending resilient arms, said arms being orthogonally positioned about a central axis and defining a cavity dimensioned to receive said center post, each of said arms being adapted to engage said positioning lugs so as to retain said cube in any one of said plurality of proper firing alignments, and electrical contact means aligned to abut a selected portion of said electrical contact ring, each of said four upward extending arms including a curved bevel on its interior side at its upper extremity, said curved bevels being aligned so that when the base of said multiple lamp photoflash package is brought into contact with said upward extending arms with said positioning lugs abutting said curved bevels said flash package can be easily rotated into proper firing alignment.

2. A receiving socket as defined in claim 1, said socket further including a plurality of upward extending support posts outwardly of said arms and positioned to abut said flat base member of said flash package and maintain it in approximately horizontal alignment.

3. A receiving socket as defined in claim 2 wherein said electrical contact means comprises two electrically conductive spring members secured on the upper portion of said chassis with electrically conductive securing means protruding through said chassis, and conductive means maintained in electrical contact with said securing means for interconnecting said receiving socket to a source of electrical power.

4. A receiving socket for multiple lamp photoflash cubes of the type which has a base section including a flat base member, an electrical contact ring, a center post, and a plurality of radially extending positioning lugs, and which can assume a plurality of proper firing alignments, said receiving socket comprising a single piece of material formed to include a chassis and a plurality of resilient arms, said arms being symmetrically positioned about a central axis and located so that the distance between adjacent arms is smaller than the width of each of said positioning lugs, each of said arms including a horizontal undercut on its inner face, said undercut being located below the upper extremity of each of said arms by a distance no greater than the distance between said positioning lugs and said flat base member so that when said flash cube is located within said socket in a first proper firing alignment each of said positioning lugs is located below said undercuts intermediate two adjacent arms and engages each of said two adjacent arms at at least one first contact point, and so that when said flash cube is rotated away from said proper firing alignment each lug always engages one of said arms at at least one second contact point, the distance between said central axis and said first contact point being greater than the distance between said central axis and said second contact point when said arms are in an unflexed position, and electrical contact means aligned to abut a selected portion of said electrical contact ring when said flash cube is engaged within said arms.

5. A receiving socket for multiple lamp photoflash cubes of the type which have a base section including an electrical contact ring and a center post carrying a plurality of radially extending positioning lugs, and which can assume a plurality of proper firing alignments, said receiving socket comprising a single piece of material molded to include a chassis and a plurality of resilient arms, said arms being symmetrically positioned about a central axis and defining a cavity dimensioned to receive said center post and free of other elements between said arms, each of said arms including means for engaging said positioning lugs so as to retain said cube in any one of said plurality of proper firing alignments, and electrical contact means aligned to abut a selected portion of said electrical contact ring.

References Cited

UNITED STATES PATENTS

| 3,353,465 | 11/1967 | Peterson et al. | 240—1.3 X |
|---|---|---|---|
| 3,398,389 | 8/1968 | Fischer et al. | 339—147 X |
| 3,407,717 | 10/1968 | Ernisse | 339—147 X |

RICHARD E. MOORE, Primary Examiner

U.S. Cl. X.R.

339—147